US008359786B2

(12) United States Patent
Visser

(10) Patent No.: US 8,359,786 B2
(45) Date of Patent: Jan. 29, 2013

(54) METHOD AND DEVICE FOR BUFFERING CONTAINERS WITH PLANTS

(75) Inventor: Anthony Visser, 's-Gravendeel (NL)

(73) Assignee: Visser 'S-Gravendeel Holding B.V., 'S-Gravendeel (NL)

(\*) Notice: Subject to any disclaimer, the term of this patent is extended or adjusted under 35 U.S.C. 154(b) by 11 days.

(21) Appl. No.: 12/303,032

(22) PCT Filed: May 24, 2007

(86) PCT No.: PCT/NL2007/000133
§ 371 (c)(1),
(2), (4) Date: Dec. 1, 2008

(87) PCT Pub. No.: WO2007/142513
PCT Pub. Date: Dec. 13, 2007

(65) Prior Publication Data
US 2009/0196725 A1 Aug. 6, 2009

(30) Foreign Application Priority Data
Jun. 2, 2006 (NL) .................................... 1031944

(51) Int. Cl.
*A01G 9/00* (2006.01)
(52) U.S. Cl. ........................................ 47/1.01 P; 47/18
(58) Field of Classification Search .......... 47/18, 1.01 P, 47/66.7, 901
See application file for complete search history.

(56) References Cited

U.S. PATENT DOCUMENTS

| 6,135,704 | A   | * | 10/2000 | Seaberg ...................... 414/791.6 |
| 6,185,866 | B1  | * | 2/2001  | Enfaradi ........................... 47/79 |
| 7,506,472 | B2  | * | 3/2009  | Leyns et al. ................. 47/1.01 P |
| 2004/0068930 | A1 | * | 4/2004 | Craig et al. ....................... 47/72 |

FOREIGN PATENT DOCUMENTS

| DE | 9104207 U1      | 9/1991 |
| DE | 102005003515 B3 | 4/2006 |
| EP | 0931441 A1      | 7/1999 |
| EP | 1308082 A1      | 5/2003 |
| NL | 1005626         | 6/1998 |
| NL | 1019548 C1      | 6/2003 |
| WO | WO 93/05643 A1  | 4/1993 |
| WO | WO 2005/084417 A1 * | 9/2005 |

\* cited by examiner

*Primary Examiner* — Rob Swiatek
*Assistant Examiner* — Lisa Tsang
(74) *Attorney, Agent, or Firm* — Morgan Lewis & Bockius LLP; Richard F. Trecartin; Victor E. Johnson

(57) ABSTRACT

A method for buffering containers (3, 74, 140) with plants includes: providing a buffer space (1) for buffering containers in a greenhouse; providing containers with plants; supplying and disposing a number of containers in a row (10-13, 107-110) in a first direction (21, 111); buffering the row of disposed containers by gripping, lifting and displacing the row through the buffer space in a second direction (39, 113) which differs from the first direction, and by setting down the row in the buffer space. A related buffering device for temporarily storing containers with plants in a buffer space includes a supply system (5, 105) for supplying containers, a disposing apparatus for disposing a number of supplied containers in a row extending in a first direction, a distributing system (36, 115) provided with at least one controllable gripping device (30, 114, 130) for gripping a row of containers, wherein the distributing system is movable substantially in a second direction which differs from the first direction, and is movable above the disposing apparatus.

22 Claims, 3 Drawing Sheets

METHOD AND DEVICE FOR BUFFERING CONTAINERS WITH PLANTS

CROSS-REFERENCE TO RELATED APPLICATIONS

Figure 1:
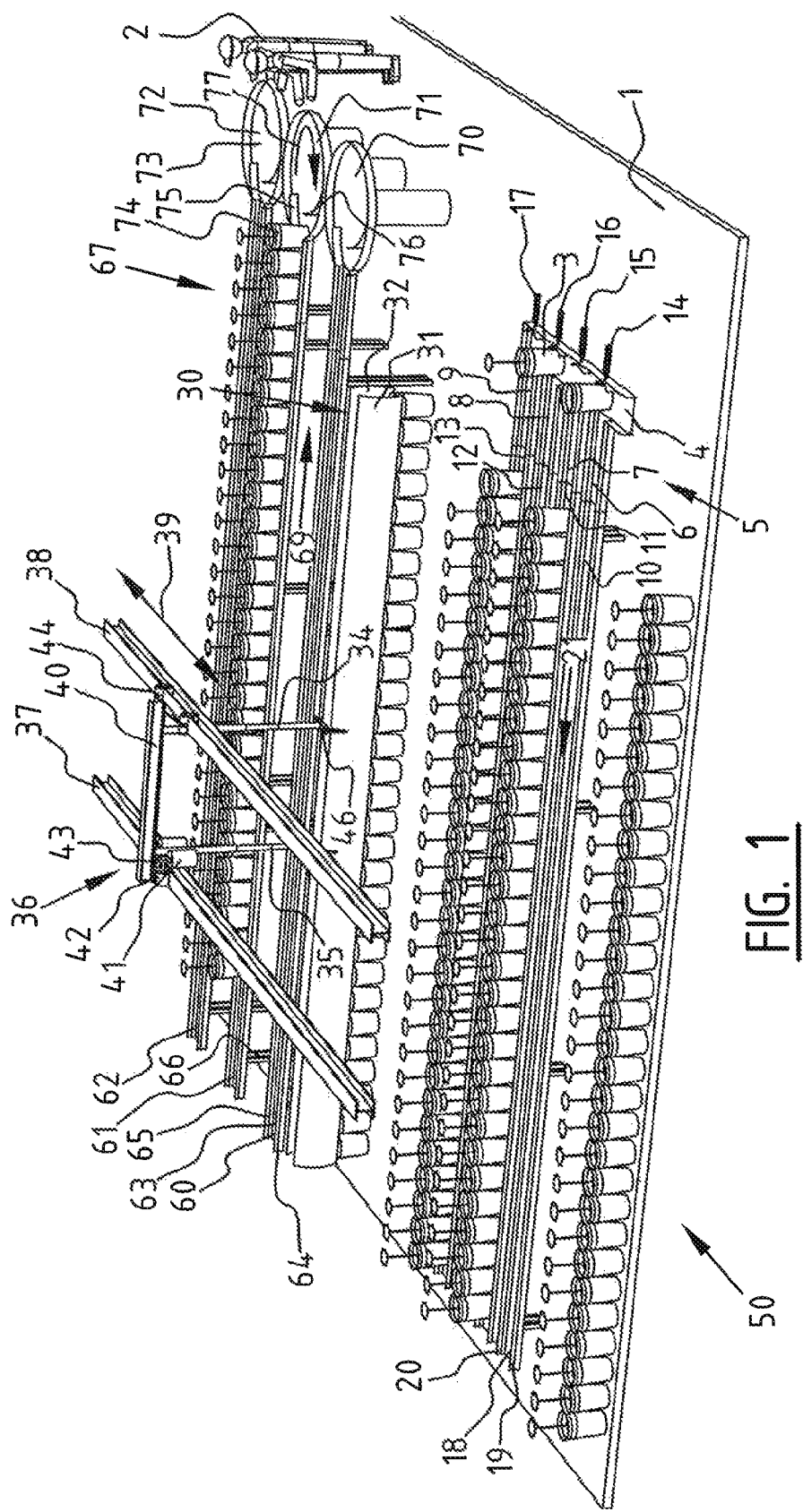

This application is a §371 application of PCT/NL2007/000133, filed on May 24, 2007 and claims priority to Netherlands Application 1031944 filed on Jun. 2, 2006, the entire contents of which applications are incorporated herein for all purposes.

The invention relates to a method for buffering containers with plants, such as trays or pots in a greenhouse. The invention also relates to a buffering device for buffering containers with plants.

It is known to cultivate plants in containers such as trays or pots. The containers can be temporarily stored by buffering thereof.

The object of the invention is to provide a method and device for buffering containers, wherein the costs of buffering are reduced considerably while ease of use remains the same or is increased compared to the prior art.

This object is achieved according to a first aspect of the invention by means of a method wherein a buffer space is provided for buffering the containers in a greenhouse. Containers with plants are also provided.

The containers are preferably supplied to the buffer space and disposed in a row in a first direction. The thus disposed containers are preferably buffered by gripping, lifting and displacing the row through the buffer space in a second direction which differs from the first direction, and by setting down this row of containers in the buffer space. A method is hereby obtained wherein containers are supplied to the buffer space and disposed in this buffer space.

The buffer space can for instance comprise a table or a floor on which the containers are placed. The table surface forms the surface on which the containers are placed temporarily for buffering. The surface on which the containers are placed does not have to be horizontal or flat. In an embodiment the surface can be provided treatment means are present in the buffer space. The treatment means, for instance a water supply with sprinkler, can be used to sustain the buffered plants. In one embodiment water draining means can also be arranged. The surface can be enclosed by an upright wall within which the water is collected and in which the containers are partially placed. A part of the container is immersed.

The buffers disposed in one or more rows are preferably gripped and lifted and set down in the buffer space. They are herein displaced through the buffer space in a second direction. The buffer space is provided with a surface. The surface extends in the first direction and in the second direction. By disposing the containers in a row extending at least in the first direction, the row of a plurality of containers can be picked up and displaced in the second direction, and thus be set down. The row of containers is thus distributed and/or dispersed over the buffer space extending in first and second direction.

It is recommended to place the row of containers in the buffer space, wherein the placed row extends in the first direction. The row comprises two or more containers. In an advantageous embodiment the row has more than ten containers. In an embodiment it is not the whole row of disposed containers that is picked up, but only a part, preferably the part which has been disposed the longest. The row is then not rotated during the displacement through the buffer space. The rows hereby remain oriented parallel to each other and the buffer space is used in effective manner.

The displacement in the second direction preferably comprises of displacing the row of containers by gripping and lifting the containers, and displacing them a distance in the second direction which is substantially equal to $C+n*x$, wherein C is a constant, n is an integer and x is a predetermined intermediate distance between the rows of containers. When the containers have a diameter of for instance eight centimeters, the predetermined intermediate distance can for instance be nine centimeters and a row of containers can be placed every nine centimeters in the buffer space. An optimal filling of the buffer space can hereby be obtained. The intermediate distance is a fixed determined distance in a part of the buffer space, for instance the part of the buffer space in which a sorted category of containers is placed. In an embodiment the intermediate distance differs per sorted, buffered containers. In a first part of the buffer space an intermediate space $x_1$ is applied for category 1 containers, and an intermediate space $x_2$ in another part of the buffer space for containers of category 2.

Offsetting of the positions can optionally be carried out, whereby a further space-saving is achieved. This is particularly advantageous in the case of round containers such as pots. The offsetting results in a higher density of buffering. In a preferred embodiment use can be made of hexagonal pots. They can be buffered in a honeycomb pattern.

According to a preferred embodiment the buffering preferably comprises of storing in a memory the distance of displacement in the second direction of the row of containers which is buffered. The memory hereby keeps track of the location, represented by the distance in the second direction, at which containers are buffered. This can be taken into account when picking up and removing the buffers.

The method further preferably comprises of sorting the containers by detecting and preferably comparing a property of the containers to a predetermined property. The supplied containers can hereby be divided into specific classes and buffered subject to these classes.

It is further recommended that the sorting further comprises of disposing the containers in different rows in accordance with the detected property. When sorting for instance takes place into three categories, three rows of containers can be disposed which can be gripped and displaced during buffering.

The rows of sorted containers preferably all extend parallel to each other in the first direction. The sorted containers disposed in different rows can hereby be gripped and displaced by the same distributing means without the distributing means having to be adjusted separately for the respective rows.

It is also recommended that the method further comprises of reserving a floor surface in the greenhouse and buffering the containers on this floor of the greenhouse by placing the containers on this floor. A method is hereby obtained wherein a considerable saving can be made in that the floor in the greenhouse is used as storage space or buffer surface for the containers.

A further embodiment of the method comprises of discharging containers by gripping, lifting and removing the row of buffered containers from the space. The buffering of the containers is hereby terminated, and they can be processed, for instance packed, for further use. The removal preferably takes place by gripping, lifting and placing the buffered containers on a discharge conveyor. The discharge conveyor preferably extends in the first direction.

According to the method, a space in a greenhouse is used to buffer the containers, wherein in this space, wherein the greater part of this space is made accessible by making use of a gripper moving in a second direction. The gripper moves over the surface on which the containers can be buffered. Use is preferably made for this purpose of a glasshouse space of the Venlo-type or a wide-span glasshouse. In an embodiment the span is 12.8 meters wide, which corresponds to the span width of an embodiment of a Venlo-type glasshouse.

Only the supply and disposition of the containers need be made possible in the buffer space, preferably by means of a guide extending in a first direction, in addition to a discharge, possibly also formed by a guide extending in a first direction. The remaining space, in particular the space where the containers are buffered, requires no modification, or hardly any, thereby achieving a considerable cost-saving. The gripper moving in a second direction can be mounted on a guide which extends in a second direction and which guides the movement. According to the invention the gripper moves in each case above the disposed row of containers to the buffer space, wherein the buffered position and properties of the buffered pots/plants are stored, and during discharge the containers complying with a request of a user are carried out of the buffer space by moving the gripper to the stored position and gripping and lifting the container to the discharge.

It is possible to stack a plurality of containers, in particular trays, on the surface. The buffer capacity hereby increases further since multiple layers of trays can be placed on each other. These are particularly stackable trays provided with stacking means, such as for instance upright edges. An array or three-dimensional structure of the buffered containers can be stored in a memory such that the buffered containers can be retrieved at a desired moment.

The invention also relates to a buffering device. The buffering device is adapted to temporarily store containers with plants, such as trays or pots, in a buffer space. The buffering device according to the invention comprises a supply means for supplying containers, a disposing means for disposing a number of supplied containers in at least a row extending in a first direction. The buffering device further comprises a distributing means provided with at least one controllable gripping means for gripping a row of containers, wherein this distributing means is movable substantially in a second direction, wherein this second direction preferably differs from the first direction. The row of containers for buffering can hereby be displaced in the second direction. Both the first and the second direction can be a straight vector and a curved line. In one embodiment the second direction is a radial direction of a circle.

According to a preferred embodiment, the buffering device further comprises a buffer space which has a surface extending substantially in the first and second direction. The containers for buffering are placed on the surface for temporary storage.

The distributing means can preferably be moved above the disposing means and through the buffer space. A buffering device is hereby obtained to which containers, such as trays or pots with plants, can be supplied via supply means and are received in the disposing means. The distributing means preferably comprises a guide which extends in the second direction and which is adapted to guide the gripping means in the second direction.

The disposing means places the containers in at least a first row which extends in at least a first direction. The disposed containers can be gripped by the gripping means of the distributing means, wherein a whole row or a part of this row can be lifted at one time. The distributing means is herein movable in a second direction, preferably at right angles to the first direction, and can thereby carry the whole gripped row to another position. The other position is situated in the buffer space, which has a surface on which the containers can be placed. Through the lifting and placing of the containers the buffer space itself, except for the disposing means and possible discharge means, is substantially free of particular provisions for buffering the containers. A considerable saving is hereby achieved compared to known buffering devices. The distributing means moves above the disposing means and is thus able to lift the containers out of the disposing means and displace them. The distributing means further moves above the surface of the buffer space and can thus set down the containers on the surface from above, and thus buffer the containers.

In a preferred embodiment the distributing means is adapted to place the containers on the surface of the buffer space in rows extending substantially in the first direction. The disposed and gripped rows of containers thus retain their original direction and are not rotated. A large number of rows of containers can hereby be placed in the buffer space parallel to the first direction and to the disposing means.

In a preferred embodiment the buffering device further comprises a discharge means for discharging containers. The distributing means is preferably movable above the disposing means, above the discharge means and through the buffer space. Buffered containers can hereby be picked up in rows and placed on the discharge means for removal from the buffering device.

It is further advantageous when the supply means, the disposing means and/or the discharge means are provided with a drivable conveyor belt. In contrast to the prior art, only these parts need be provided with drivable conveyor belts for buffering of the containers. Storage and buffering of the containers in the buffer space is made possible by the distributing means, wherein one distributing means can be used for all buffered containers.

The disposing means preferably comprises a guide extending in the first direction. This guide is preferably a gutter. The disposing means is thus able to position the containers in a row in a first direction, so that they can be gripped by the gripping means of the distributing means.

The buffering device is preferably provided with a detecting means for detecting at least one property of the containers. It is hereby possible that the buffering device can select or sort the containers on the basis of the measured property. In a preferred embodiment the detecting means is connected to the memory, whereby the property detected on the container is stored in the memory. The memory can keep track of the position of the container in the buffering device, and the property can be output when the container is discharged from the buffering device.

The buffering device preferably comprises a number of disposing means arranged parallel to each other and extending in the first direction for the purpose of disposing a number of rows of containers. A large number of containers can hereby be disposed, wherein the containers all form a row extending in the first direction.

It is further recommended that the supply means is adapted to supply the containers to the disposing means in accordance with the detected property, in particular to the different disposing means arranged parallel to each other. The for instance four disposing means can then be used to dispose containers which have a determined property. A row of containers with corresponding properties, as detected by detecting means, is hereby obtained. During buffering a row with corresponding properties is buffered in one operation. During discharge a row with corresponding properties can then be discharged in one operation.

The buffering device preferably comprises a control provided with a memory for storing at least one property of the containers placed in the buffer space, in particular the placed row of containers. The properties detected on the containers can hereby be taken into account during discharge.

The gripping means is preferably a gripper. In an embodiment the gripping means is provided with water collecting means. Water released from the gripped containers can hereby be collected, in particular when the containers are moved above the supply means or above buffered containers in the buffer space. The drops could cause damage to the buffered containers or the plants in the buffered containers. The water collecting means can for instance comprise a pivoting collecting container which is pivotable under the gripped containers when the gripping means is moved in the second direction.

Although the invention will be described on the basis of embodiments as shown in the accompanying drawings, it will be apparent to the skilled person that the invention is not limited to the shown examples. The invention is limited solely by the appended claims. It will also be apparent to the skilled person that it is possible to file divisional applications for components referred to in the description, irrespective of whether or not advantages of the features are stated. It will also be apparent to the skilled person that various combinations of the different measures of the device according to the invention stated in the description are possible, and that the skilled person can combine these measures in different advantageous ways, even to form devices of which the advantages are here indicated indirectly or directly in the description.

Figure 2:
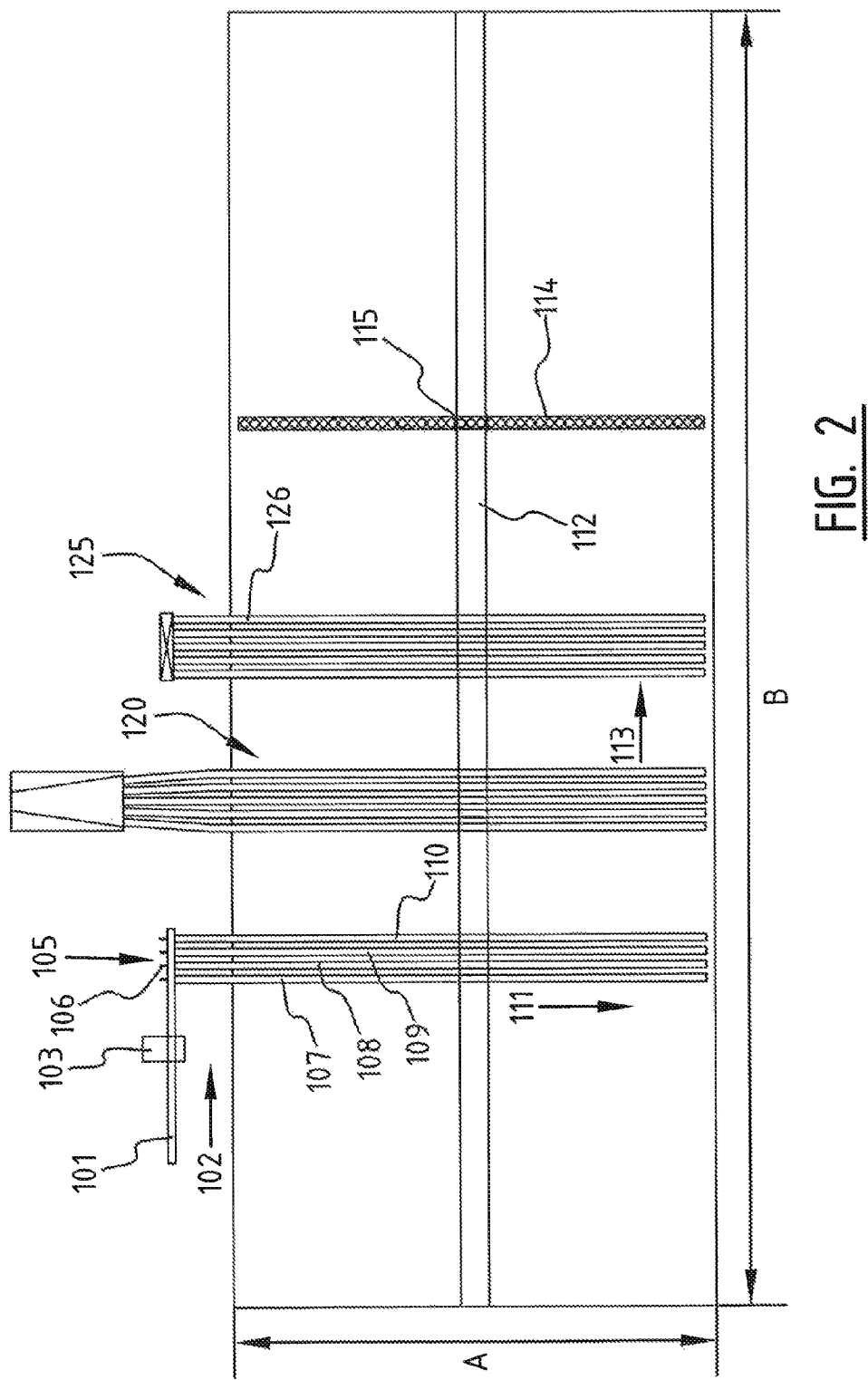
Figure 3:
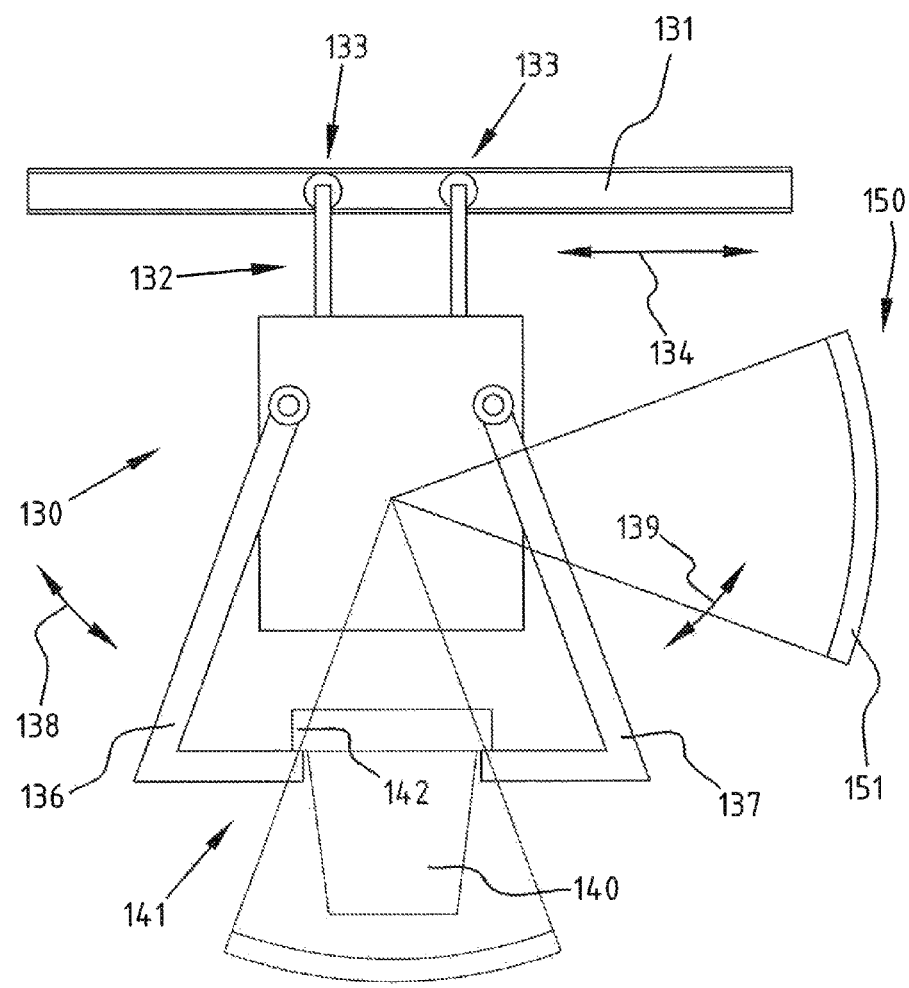

The invention will be further described on the basis of the preferred embodiments which are shown in the accompanying drawings, in which:

FIG. 1 shows a perspective view of a buffering device according to a first embodiment, FIG. 2 shows a top view of a second embodiment of a buffering device, FIG. 3 shows a detail of a gripping means as according to an arrow I in FIG. 1 according to a second embodiment.

FIG. 1 shows a view of a part of a space in a greenhouse. A greenhouse has a number of roof spans, such as a greenhouse of the known Venlo-type. In FIG. 2, A indicates the width of a roof span in an embodiment of 12.8 meters. The roof span also has a determined length. This length depends on the greenhouse. In one embodiment the length can be over 50 meters. It is possible to use the buffering device in a greenhouse wherein practically the whole floor surface under a roof span is used as buffer space for the buffering device and as buffer surface. In another embodiment a plurality of roof spans is used and/or a part of a roof span is used. In the embodiment shown in FIG. 2 the space of a roof span is used partly for the supply and discharge of containers and for buffering the containers. Sorting devices and other devices are additionally placed under an adjacent roof span part.

The greenhouse has a floor 1. Apparatus can be placed and/or employees 2 can be active and/or pots can be placed on floor 1.

In the shown embodiment containers 3 are supplied on a conveyor belt 4 of a supply device 5. The supply device is adapted as sorting means. The supply device comprises four sorting channels 6-9. A supplied container 3 is classified and, depending on the classification, discharged via one of the sorting channels 6-9 to the respective disposing means 10-13 situated downstream of the respective sorting channels 6-9.

Pots/plants of a determined preset quality are pushed into the first sorting channel with a pusher 14 and fed to the first disposing means 10 The pusher is connected to a control. The pusher is a pushing-over device. On the supply device can for instance be arranged a detecting means, such as a camera, which performs a determined measurement and makes a comparison with a parameter stored in a memory. On the basis of the comparison the control can switch on the pusher and push the pot/plant into the respective sorting channel.

In another embodiment containers 3, such as pots provided with a plant, are placed on the supply device by the operative. The operative can here perform a determined sorting. Pots/plants of a determined quality can be placed on the first sorting channel 6, pots/plants of a second quality on second sorting channel 7, and so on.

Disposing means 10-13 form a guide and comprise a transport means, embodied in known manner by a belt 18 tensioned between two rollers, and upright wall parts 19,20 which form a gutter. Pot 3 stands on the belt and is guided by the wall parts. When driven in the usual manner (not shown), the conveyor belt will transport the pot in a first direction as according to arrow 21.

When a container is supplied via the sorting channel, disposing means 10-13 are adapted to move this container as far as possible in the direction of arrow 21, until it collides with the container already in position. Despite the movement of the conveyor belt, the containers already in position will not change position. The conveyor belt and the container slip, wherein the container retains the position it occupies. In another embodiment the container is lifted off the conveyor belt once the container has reached the disposed position.

A container which is being guided on an empty gutter of a disposing means 10 is moved to the end of the gutter and then runs up against a protrusion or other stop means.

In the embodiment shown in FIG. 1 disposing means 11 and disposing means 13 are almost completely filled with a row of containers extending in first direction 21. Although the shown embodiment shows a straight row, this is not essential to the invention and the first direction 21 can for instance be curved.

The row of containers disposed according to the invention can be gripped with a gripping means 30 which is formed by two clamping sheets 31,32. Sheets 31,32 can for instance grip on or under the rim of the pot. FIG. 1 shows a gripped row of containers which are clamped and gripped by gripping means 30.

Gripping means 30 is connected via a number of controllable cylinders 34,35 to distributing means 36, which in this embodiment comprises two profile parts 37,38 embodied as a rail, wherein this rail extends in a second direction 32, in the shown embodiment transversely of first direction 21. Rails 37,38 are adapted to guide a carriage 40 on which cylinders 34,35 are mounted. Carriage 40 also comprises a drive means 41 which is connected to a number of rollers 42,43 in order to move carriage 40 over rails 37,38 as according to arrow 39. Carriage 40 further comprises bearing-mounted wheels 44.

When the disposed row of containers is gripped by gripping means 30, these containers can be displaced in the second direction 39. In the shown embodiment the row of containers is herein lifted out of the disposing means by clamping in that sheets 31 and 32 can be moved toward each other by means of a controllable cylinder 46. Through lifting thereof, the containers can be placed in another part of the space.

According to the invention the lifting and displacing comprises of displacing the row of containers in a second direction 39 and placing the row in the buffer space. In the shown embodiment such a row is placed on floor 1. A considerable saving is hereby made, since there are no special measures for buffering the row of containers other than distributing means 36. There is no separate conveyor belt from the disposing means to the position where the containers are buffered. The containers are also placed on floor 1 without a particular support being necessary for this purpose. Floor 1 is immediately suitable for placing of the containers.

When a row is buffered, a number of parameters relating to the buffered row is stored in a memory of a control means. One parameter can be the buffering location. In the shown embodiment this parameter can be indicated with a distance in the second direction. The sorting criteria can also be stored. A possible parameter is the moment of buffering. This for instance enables a periodic treatment of the buffered plants, as will be described hereinbelow. Yet another parameter can be the size of the containers or the number of containers. The data are stored in a memory. The memory can be coupled to a network via a server. It is hereby possible to monitor the buffered plants/pots/trays remotely. A better control of the buffering hereby becomes possible. A seller can request what is currently in stock. In an embodiment it is possible to place an order via the interface, whereby the buffering device receives an instruction remotely, whereby the requested buffered containers are retrieved in order to be removed.

Because a row of containers is disposed and gripped, it is possible to suffice with the use of a distributing means. This distributing means in turn replaces the solutions known in the prior art for transporting the containers to a suitable location for buffering.

FIG. 1 shows a row 50 of containers which are placed on floor 1. Row 50 extends in the first direction 21 and is displaced a distance in the direction of second arrow 39 relative to disposing means 10-13.

A number of rows of containers can be buffered parallel to each other in the buffer space, which is formed in the shown embodiment by floor 1 which extends in the first direction and in the second direction. A number of rows can be placed parallel to each other on the floor. They extend in particular parallel to the first direction 21.

In an embodiment the containers can be set down in offset manner, whereby a further concentration of the buffered containers takes place.

When containers with a diameter of 8 cm are for instance placed on floor 1, containers can be placed every 9 cm in rows on floor 1 as shown in FIG. 1. An intermediate space of 1 cm is hereby present in each case between the disposed and buffered containers, whereby sheets 31 and 32 can engage under the rim of the pot.

The buffering device according to FIG. 1 is provided with a control which can actuate the controllable elements such as the pushers, the disposing means, conveyor belts and distributing means 36. The diverse drivable elements can be provided with a radio receiver, whereby the control can feed the instructions in wireless manner to the respective elements.

In an embodiment the control is provided with an input means (not shown) with which an operative 2 can indicate that a determined buffered type of container/plant can be removed from the buffering and further processed. After these instructions the distributing means will collect the row. The position of the row of containers 50 placed on floor 1 is stored in a memory of the control (not shown). When the relevant row is requested, distributing means 36 moves to the disposed row 50 as according to arrow 39 and will grip this row by means of clamping.

When the desired row has been collected with the distributing means, the distributing means moves over rails 37,38 toward discharge means 60-62. These latter are formed by a conveyor belt 63 and upright wall parts 64,65. They are placed on a frame 66. In FIG. 1 a row 67 has just been placed on discharge means 61. Discharge means 60-62 form a guide which in this shown embodiment extends parallel to the first direction 21. No rotation and the like of the distributing means is hereby necessary.

The control guides distributing means 36 to a position above respective discharge means 60-62 and places the pots on the conveyor belt, between wall parts 64,65. The distributing means then moves away again.

Row 67 is discharged as according to arrow 69 in the direction of one of the three buffering discs 70-72. The buffering disc comprises a top 73 which can rotate. A container 74 is guided between arms 75,76 and will be supported by top 73, and herein rotate as according to arrow 77. Operative 2 can remove from the table and further process the containers 74 discharged from the buffering device. In another embodiment discharge means 60-62 can be coupled to an automatic processing. A further processing can for instance be formed by a packaging unit or the like.

The further treatment/processing of the pots does not form part of the present invention.

FIG. 2 shows a second embodiment. A feed belt 101 carries containers to a detection 103 as according to arrow 102. One or more parameters of the containers are here detected. Detecting means 103 forms part of a sorting device. Here a parameter can be detected and compared to a predetermined value stored in a memory of the control means (not shown).

Conveyor belt 101 carries the containers further to the sorting device/supply device 105. This is comparable to the first embodiment formed by means of pushers 106. The containers can be placed by the pushers on one of four guides 107-110, which are embodied in like manner to those of the first embodiment. Guides 107-110 form disposing means for disposing of the containers in a row, wherein the row extends in a first direction 111. A guide 112, mounted above disposing means 107-110, for instance on a ceiling of a greenhouse, extends in the second direction 113, which in the shown embodiment is at right angles to the first direction 111. Suspended movably from guide 112 is a distributing means 115, which comprises a gripping means 114 for gripping a disposed row of containers from disposing means 107-110.

The buffering device according to the invention can be placed in a greenhouse. A greenhouse has roof spans, which have for instance a width A as shown in FIG. 2. The roof span has for instance a length B as shown in FIG. 2. The buffering device is placed for the greater part under one of the roof spans of the greenhouse, indicated with A×B. Distributing means 115 can be displaced over the whole width along guide 112. A gripped row of pots can thus be lifted from disposing means 107 and placed at another location, preferably in a parallel row in the buffer space which has a surface area of A×B.

The position of the placed buffer is stored in a memory. The buffers can be placed in a number of rows. The rows can be placed at regular distances from each other. A high density of buffered pots can hereby be achieved in the buffer space.

In the shown embodiment the device also comprises a discharge device 120 which is formed by a number of guides which extend parallel to each other and which can for instance be embodied as in FIG. 1, or be provided in another manner with means for discharging a row of pots.

A further treatment device 130 can be present in addition to the buffering device. This device can also be placed partially in the A×B space of the roof span. This device also consists of a number of parallel guides or gutters in which containers can be placed. It is for instance embodied as a water tank. At fixed times the buffered plants/pots can be lifted and placed by distributing means 115 onto a gutter 131 of treatment means 130. The pots can here for instance be placed in water.

In a preferred embodiment the gripping means 114 of distributing means 115 is embodied so as to place the plants on a gutter 131. The gripping means is particularly embodied here to collect water in which the row of plants is immersed, so that the row of plants does not drip onto plants buffered in the buffer space when the gripped row moves back to the original position or to a new position over those plants in the buffer space. Then stored in the memory here is that the plants are provided with water at a determined moment, and a new position of the plants with the properties detected in detecting device 103 is then linked to the new position.

FIG. 3 shows a detail of another embodiment of a gripping means 130. A cross-section is shown here. Gripping means 130 is suspended below a rail 131 extending substantially in a horizontal plane. A trolley 132 connects gripping means 130 to rail 131. The trolley comprises a number of wheels 133 which are received in the rail. The rail can have an extruded profile in which the wheels engage. A drive means (not shown) is connected to the wheels and can displace trolley 132 in the second direction as according to arrow 134. The gripping means herein moves over the buffered trays or pots.

Gripping means 130 according to this second embodiment comprises a housing 135 to which two arms 136,137 are pivotally connected, which can pivot as according to arrows 138,139. In the shown position a pot 140 can be gripped and clamped between arms 136,137 between the outer ends provided with hooking elements. In this embodiment the hooking elements 141 grip under an edge 142 of the pot. The arms are connected to body 135 with a hinge. A drive means (not shown) can cause the two arms 136,137 to pivot around the hinge. The drive means can be controlled remotely.

Gripping means 130 according to this second embodiment is also provided with a larger third arm 150. This is embodied as water or drop-collecting element. In the shown position arm 150 has been moved to a position in which pot 140 can be gripped by arms 136,137. Once the pot has been gripped and lifted in that the distance between housing 135 and rail 131 is reduced by means of a suitable drive means such as a cylinder, the third arm can be pivoted around hinge 152 as according to arrow 139, wherein the arcuate part 151 of the third arm is positioned under the gripped container, as shown with broken lines. Drops of water possibly formed on the container will now be collected in arcuate form 151 and will not drop onto plants over which gripping means 130 is moved during buffering. This results in less damage. The skilled person will be familiar with possible measures whereby water collected in arcuate part 151 can be drained at the moment containers are being placed on a surface again, when the third arm must be pivoted back to the position shown in FIG. 3. A further draining means can be arranged on arcuate part 151.

It will be apparent to the skilled person that different variations are possible within the concept of this invention. The invention is therefore not limited to the shown embodiments. Various components referred to in the description can be identified as possible basis for divisional applications.

The invention claimed is:

1. Buffering device for temporarily storing containers with plants in a buffer space, comprising:
   a supplier for supplying containers;
   a disposer for disposing a number of supplied containers on a transport belt in an array including a plurality of rows extending in a first direction parallel to a direction of travel of the transport belt;
   a distributor for distributing the containers provided with at least one controllable gripper for gripping a whole row of containers simultaneously, wherein the distributor is movable substantially in a second direction which differs from the first direction, and is movable above the disposer;
   a detector at the supplier for detecting at least one property of the containers;
   two or more disposers for disposing the containers; and
   a sorter for sorting the containers in the different disposers in correspondence with a predetermined property detected by the detector.

2. Buffering device as claimed in claim 1, wherein two or more disposers are arranged parallel to each other and extend in the first direction for the purpose of disposing at least two whole rows of containers.

3. Buffering device as claimed in claim 1, wherein the buffering device comprises a control provided with a memory for storing at least one property of the whole row of containers placed in the buffer space.

4. Buffering device as claimed in claim 3, wherein the buffering device comprises a memory for storing the distance of displacement in the second direction.

5. Buffering device as claimed in claim 1, wherein the distributor comprises a guide extending in a second direction for guiding the gripper in a second direction.

6. Buffering device as claimed in claim 1, wherein the buffering device further comprises a discharger for discharging the containers, wherein the distributor is movable above the disposer, above the discharger and through the buffer space.

7. Buffering device as claimed in claim 6, wherein at least one of the supplier, the disposer, the discharger, and a combination of the same is provided with a drivable conveyor belt.

8. Buffering device as claimed in claim 1, wherein the disposer comprises a guide extending in the first direction.

9. Buffering device as claimed in claim 8, wherein the guide is a gutter.

10. Buffering device as claimed in claim 1, wherein the buffering device comprises a buffer space extending substantially in the first and second direction.

11. Buffering device as claimed in claim 10, wherein the buffer space has a surface extending substantially in the first and second direction, and wherein the distributor is adapted to place containers on the surface of the buffer space.

12. Buffering device as claimed in claim 10, wherein the buffer space extends on either side of the disposer in a second direction.

13. Buffering device as claimed in claim 1, wherein the distributor is adapted to place in rows extending substantially in the first direction.

14. Buffering device as claimed in claim 1, wherein the at least one controllable gripper comprises two clamping sheets for gripping on or under the row of containers.

15. Buffering device as claimed in claim 1, wherein the at least one controllable gripper comprises:
   a housing;
   pivot arms each pivotally connected to the housing and arranged opposite to one other relative to an intended row of containers to be gripped; and
   a pivot driver controlling movement of the pivot arms.

16. Buffering device as claimed in claim 15, wherein the at least one controllable gripper further comprises a water collecting element pivotally connected to the housing by another pivot arm.

17. Method for buffering containers with plants in a greenhouse, comprising:
   providing a buffer space for buffering containers in a greenhouse;

providing at least two containers with plants;

supplying and disposing of a number of containers on a transport belt in an array including a plurality of rows extending in a first direction parallel to a direction of travel of the transport belt, each row containing a plurality of containers;

buffering a whole row of disposed containers by gripping, lifting and displacing the whole row simultaneously through the buffer space in a second direction which differs from the first direction, and by setting down the whole row in the buffer space; and sorting the containers by detecting and comparing a property of the containers in the greenhouse to a predetermined property;

wherein the sorting further comprises disposing of the containers in different rows in accordance with the detected property.

18. Method as claimed in claim 17, wherein the buffering also comprises storing in a memory the distance of displacement in the second direction.

19. Method as claimed in claim 17, wherein setting down comprises placing the whole row, wherein the whole row extends in the first direction.

20. Method as claimed in claim 17, wherein the displacement in the second direction of the whole row of containers is performed over a distance substantially equal to $C+n*x$, wherein C is a constant, n is an integer and x is a predetermined intermediate distance between the plurality of rows of containers.

21. Method as claimed in claim 17, wherein the method further comprises reserving a floor surface in the greenhouse and buffering the containers on this floor of the greenhouse.

22. Method as claimed in claim 17, wherein the method further comprises discharging the containers by gripping, lifting and removing the whole row of containers from the buffer space.

* * * * *